United States Patent [19]

Calabrese

[11] 4,253,551
[45] Mar. 3, 1981

[54] MECHANICAL SNUBBER ASSEMBLY

[75] Inventor: Richard A. Calabrese, Newtown, Conn.

[73] Assignee: Anchor/Darling Industries, Inc., Bala Cynwyd, Pa.

[21] Appl. No.: 897,102

[22] Filed: Apr. 17, 1978

[51] Int. Cl.³ .............................................. B60T 7/12
[52] U.S. Cl. .................................. 188/134; 74/89.12; 74/89.14; 74/99 A; 74/425; 188/1 B
[58] Field of Search ............... 188/1 B, 134, 266, 129; 74/89.1, 89.11, 89.12, 89.14, 96, 99 R, 99 A, 425, 426, 458

[56] References Cited

U.S. PATENT DOCUMENTS

| 657,349 | 9/1900 | Jones | 74/458 |
|---|---|---|---|
| 1,194,654 | 8/1916 | Moore | 74/724 |
| 1,514,491 | 11/1924 | Wildhaber | 74/458 |
| 1,885,173 | 11/1932 | Bertram | 74/99 R |
| 3,012,448 | 12/1961 | Abraham | 74/89.14 X |
| 3,203,257 | 8/1965 | Geyer . | |
| 3,242,791 | 3/1966 | Smith | 188/1 B |
| 3,348,424 | 10/1967 | Schaverien | 74/89.14 X |
| 3,756,351 | 9/1973 | Sasaki | 188/1 B |
| 4,100,816 | 7/1978 | Clark | 74/89.14 |

FOREIGN PATENT DOCUMENTS

| 749662 | 5/1933 | France | 188/266 |
|---|---|---|---|
| 1216557 | 12/1970 | United Kingdom | 74/425 |
| 1273507 | 5/1972 | United Kingdom | 74/425 |

*Primary Examiner*—George E. A. Halvosa
*Attorney, Agent, or Firm*—Dann, Dorfman, Herrell and Skillman

[57] ABSTRACT

A highly effective, multi-purpose mechanical snubber is achieved by providing an elongated, centrally disposed, axially movable rack member controllably engaged with at least one worm, having an axis of rotation substantially parallel to the central axis of the rack member and mounted for rotation about said axis in response to axial translation of the rack member. In one embodiment, the mechanical snubber also incorporates an inertial mass which is rotationally responsive to the rotational movement of the worm. By employing one or two worms and rotationally driving the inertial mass in similar or opposed directions, various alternative vibratory control systems are achieved with the single mechanical snubber construction of this invention.

11 Claims, 14 Drawing Figures

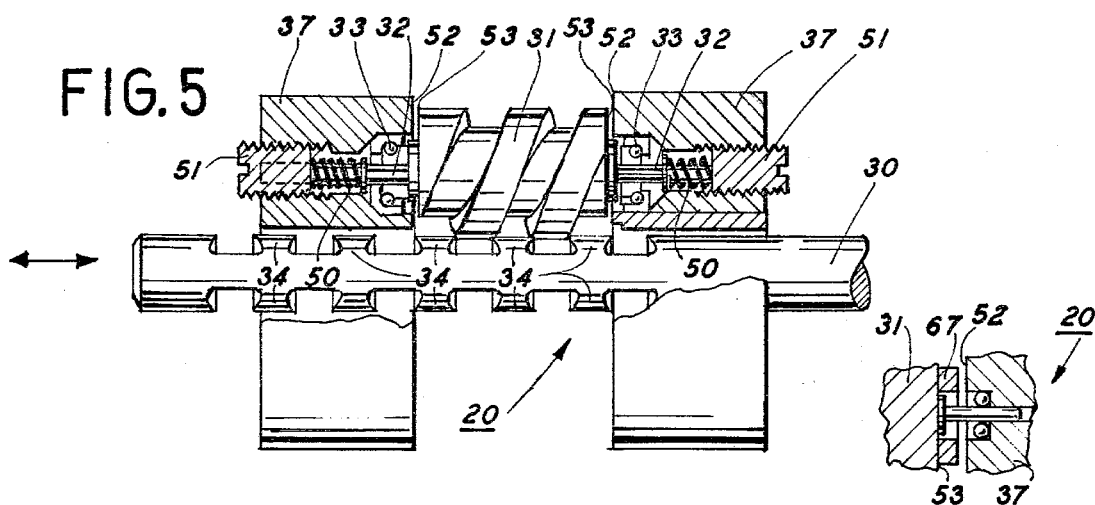
FIG. 5
FIG. 5A
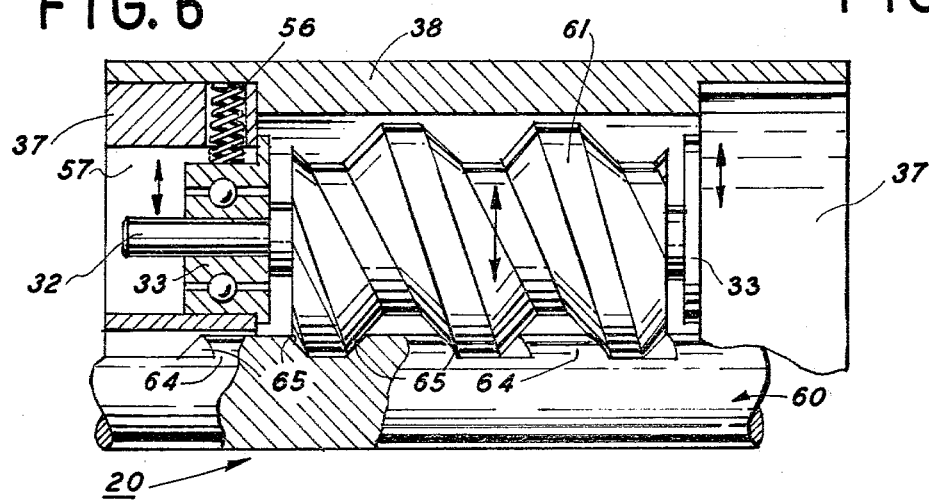
FIG. 6
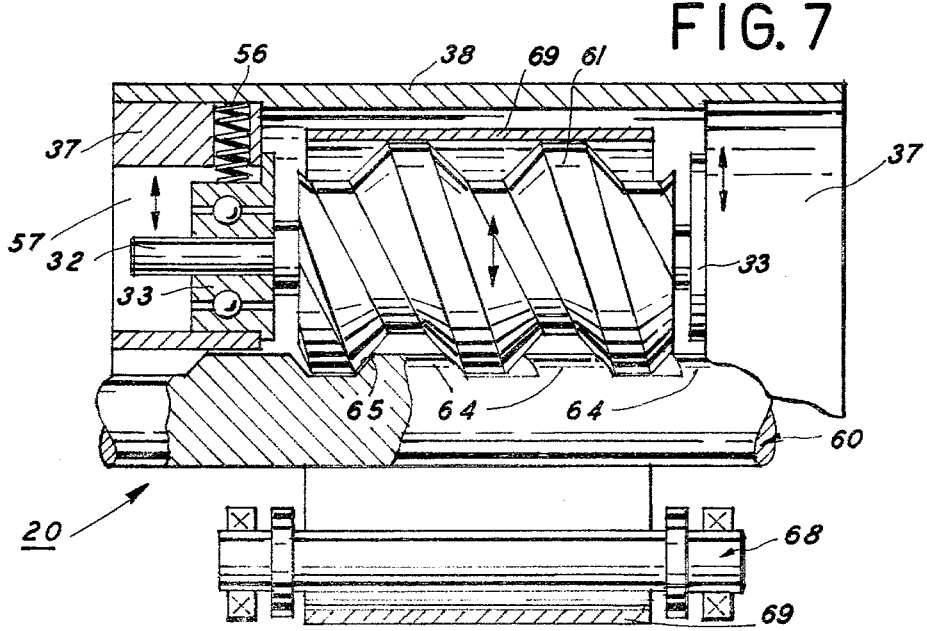
FIG. 7

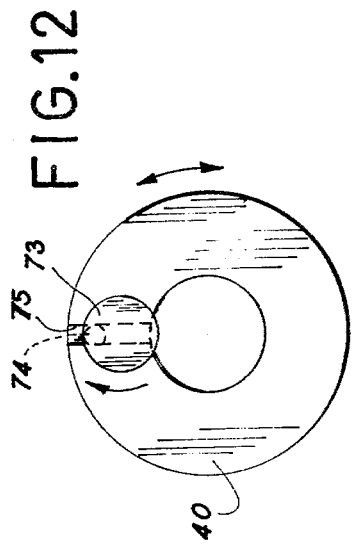
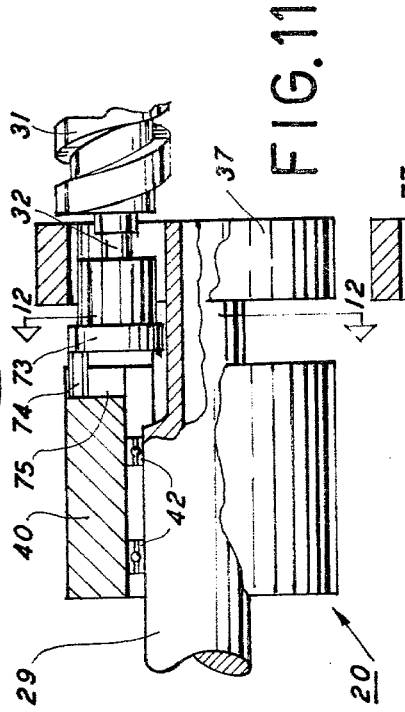
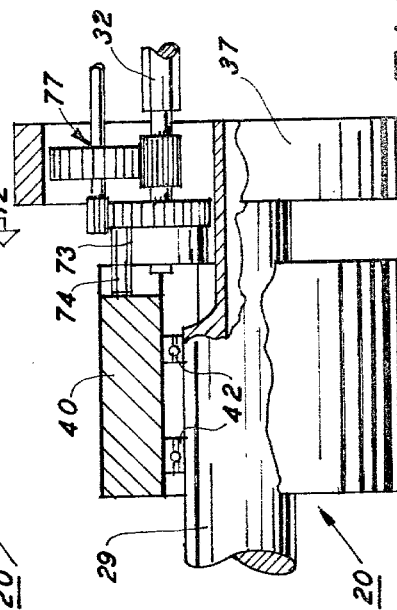
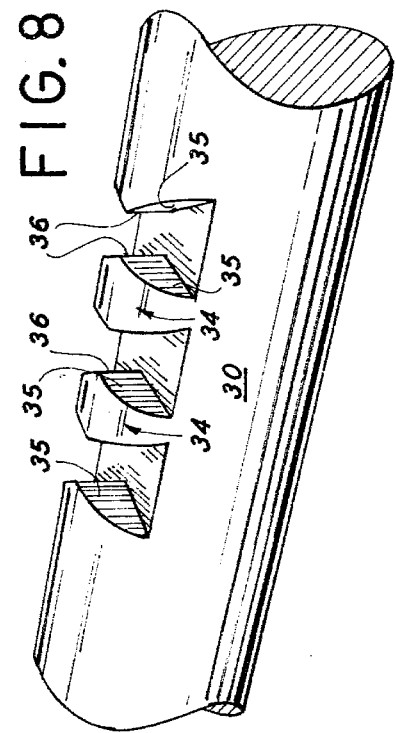
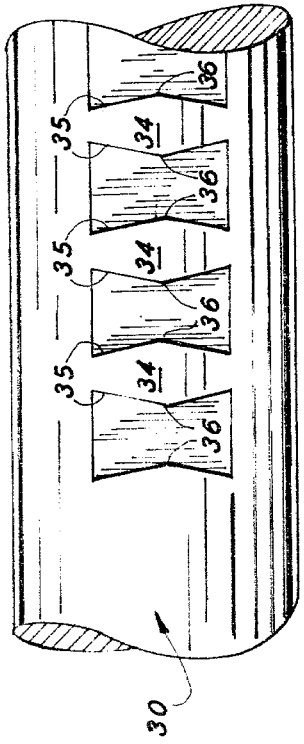
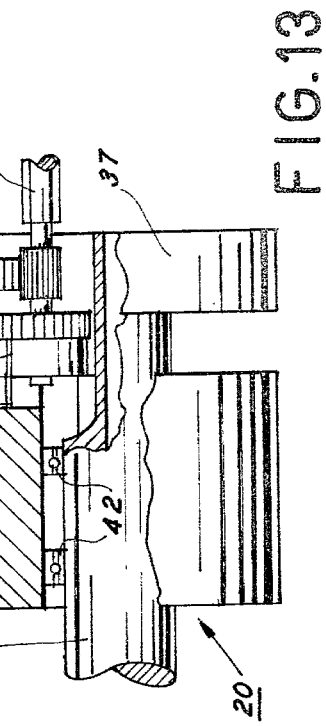

MECHANICAL SNUBBER ASSEMBLY

CROSS-REFERENCE TO RELATED APPLICATION

Certain details of the mechanical snubber assembly described herein are claimed in a copending application of Richard A. Calabrese and Robert E. Fandetti, Ser. No. 897,101, filed Apr. 17, 1978, now U.S. Pat. No. 4,187,933.

BACKGROUND OF THE INVENTION

This invention relates to shock and vibratory movement control systems and, more particularly, to mechanical snubbers for equipment protection.

Snubbers have long been used on various types of equipment where thermal expansion or vibratory motion can be anticipated and would produce equipment breakdown or failure. In particular, snubbers are employed on such items as piping systems, valves, pump, steam boilers, high temperature and high pressure vessels or chambers. With the increasing use of nuclear power plants, snubbers become increasingly important in order to withstand earthquakes while also allowing piping within the system to expand and contract during its normal operations.

When installed on a particular structure such as a piping system, this snubber typically allows the connected system to expand or contract during its normal heating or cooling cycle. However, when the system is subjected to vibratory or linear acceleration, the snubber controls the responsive acceleration of the system controlling its inertial forces, thereby eliminating any harmful effects.

Many conventional prior art snubbers employ hydraulic systems in order to achieve the desired force damping Such a system is shown in U.S. Pat. No. 3,376,957 of Alois Baumgartner, issued Apr. 9, 1968. Such hydraulic systems as disclosed in this patent, as well as other prior art hydraulic snubbers all suffer from common problems of leakage, and repeated maintenance requirements and difficulties in functioning through extreme temperature changes and wide radiation levels.

In order to eliminate the inherent disadvantages of hydraulic snubbers, various mechanical snubbers have been developed. The typical prior art mechanical snubbers generally incorporate ballscrews in their construction in order to obtain the necessary conversion from axial to rotational movement. In addition to being extremely expensive, ballscrews rely upon the point contact between the steel ball bearings and the screw itself in order to develop the desired transition from axial to rotary motion. However, under vibratory conditions especially this type of point contact produces brinelling between the ball and the screw flank, thereby eventually causing the snubber to become completely ineffective.

The following patents represent the known prior art which teach the requirement for ballscrews in the particular construction of the mechanical snubbers as disclosed:

Suozzo: U.S. Pat. No. 3,637,176
Suozzo: U.S. Pat. No. 3,669,391
Sasaki: U.S. Pat. No. 3,756,351
Suozzo: U.S. Pat. No. 3,809,186
Yang: U.S. Pat. No. Re. 29,221
Banks: U.S. Pat. No. 4,054,186

These references are typical of prior mechanical snubbers in their incorporation and necessity for a ballscrew assembly in order to achieve the desired conversion from axial to rotary motion. By referring to FIG. 3 of Banks, the typical construction and operation of the ballscrew can best be seen.

Ballscrew nut 27 is threadedly engaged with ballscrew assembly 28 while also engaged via axial slide 26 to end assembly 22. When end assembly 22 moves axially, due to system expansion or vibratory induced movement, ball nut 27 advances axially over ballscrew 28 causing the rotation of ballscrew 28. This induced rotation also causes the rotation of inertial mass 33 which is mounted at the opposed end of ballscrew 28.

This construction is typical of mechanical snubbers and represents the general construction shown in prior art references. Banks also teaches the incorporation of a brake shoe system to control the rotation of the inertial mass.

In Yang, a conventional ballscrew-inertial mass combination is disclosed which additionally incorporates a spring construction and spring clutch arrangement which controllably increases spring tension on the inertial mass during desired conditions. In Suozzo, U.S. Pat. No. 3,809,186, the typical ballscrew system is employed with an additional spring device rotatably mounted along the axis of the screw member in order to control axial advance of the screw member for normal thermal expansions, while also providing stop means for converting the snubber into a rigid strut under shock loading.

In Sasaki, the axial motion is converted to rotational motion through a nut member mounted to a rotational shaft with two inertial masses mounted at both ends of the shaft. Although a ballscrew is not specifically shown, a ballscrew system is described in Sasaki as employable if smoother rotation is desired. Although the ballscrew system is deemed optional by Sasaki, the construction disclosed therein is substantially identical since Sasaki merely teaches an axially moveable nut member mounted to a screw type shaft member for inducing rotation of the shaft member.

In the remaining two references, Suozzo teaches a conventional ballscrew construction in combination with various alternative embodiments of a feedback system which employs the axial movement of the pipe to change the effective length of a substantially rigid strut connecting the moveable pipe to a stationary structure. In both patents, Suozzo teaches the necessity for a rigid strut member connected to the particular pipe in a manner which will allow the strut to move axially in response to various forces imposed upon the pipe. In each instance, the axially moveable strut incorporates a screw member at its distal end which is threadedly engaged with a nut member. The axial movement of the strut causes the nut member to rotate which in turn rotates various combinations of bevel gears to achieve the desired feedback.

Other prior art mechanical snubbers have attempted to eliminate the expense of ballscrews by relying upon frictional means, including the threaded engagement of cooperating members. However, the common problems of heat and wear, associated with friction devices, has shown these types of snubbers to be unreliable.

Two typical prior art snubbers which employ a friction arrangement are found in U.S. Pat. No. 3,059,727 of Fuchs and 3,983,965 of Wright. The device disclosed in Wright is capable of allowing a supported element to move relative to a fixed wall below a predetermined threshold, while any greater motion converts the snubber into a fixed, blocked strut. As shown in FIG. 2, this device incorporates a threaded member 69 which is engaged with a second member 49 having internal and external threads and also mounted for rotation. As motion arrester 21 axially moves below the desired threshold, engagement between thread member 69 is fixedly mounted and causes threaded member 49 to rotate about its central axis. In this way, the effective length of device 21 is either shortened or lengthened. However, if a force above the said threshold is transmitted along threaded member 69, shear pin 83 is broken causing threaded member to rotate. This prevents the rotation of threaded member 49 maintaining the strut in a fixed locked condition with the outside teeth of member 49 firmly engaged with teeth 43.

In Fuchs, an energy absorption device is disclosed having similar drawbacks as in Wright. The device in Fuchs employs splined members engaged with cooperating sleeves with ball bearings being employed in order to reduce the effects of friction. Also, friction means are incorporated in the device in order to achieve a threshold with which the devices will not move. When this threshold has been reached, the force will be absorbed by the relative movement of the splined and mating sleeves are converting the axial motion into rotary motion which is absorbed by the friction means.

In both Wright and Fuchs, the device is capable of handling only a single input load in excess of the preset restraint level. Once either system has realized input greater than the preset value, both systems have to be either reset or repaired in order to function again.

Therefore, it is a principal object of the present invention to provide a mechanical snubber which is inexpensive to manufacture and provides repeated and reliable performance.

Another object of the present invention is to provide a mechanical snubber having the characteristic features defined above which eliminates the necessity for ball-screws.

Another object of the present invention is to provide a mechanical snubber having the characteristic features described above which substantially eliminates binding of the operating components.

Another object of the present invention is to provide a mechanical snubber having the characteristic features defined above employing radial line contact of elements in order to convert the axial motion into rotary motion, thereby eliminating potential brinelling of the cooperating elements.

Another object of the present invention is to provide a mechanical snubber having the characteristic features defined above which is lightweight, shorter, and completely interchangeable with speed and accuracy.

A further object of the present invention is to provide a mechanical snubber having the characteristic features defined above which eliminates any requirement for structural welds as well as eliminating the necessity for critical tolerances between moving parts.

Other and more specific objects will in part be obvious and will in part appear hereinafter.

SUMMARY OF THE INVENTION

The mechanical snubber of the present invention eliminates the prior art problem by employing a unique system for converting axial motion to rotary motion. In this invention, a rack member, mounted for axial translation in the snubber, is employed to drive a worm which is rotationally mounted in the snubber. In this way, the axial motion introduced to the snubber, through the equipment to which it is mounted, is converted into rotary motion using a minimum number of parts all of which are quickly and easily assembled as well as comparatively inexpensive.

The mechanical snubber of the present invention provides a further simplification and adaptability to the snubber art by achieving a mechanical snubber construction capable of being quickly and easily varied in construction to achieve a variety of alternative snubber type functions. In particular, the mechanical snubber of the present invention can be constructed as (1) a seismic acceleration limiter type snubber, (2) a seismic acceleration damper type snubber, (3) a seismic acceleration restraint type snubber or (4) a seismic velocity restraint type snubber.

All of these alternative structures employ the same basic construction, with a minimum of alternative parts. In this way, uniformity of construction, ease of assembly, repair, and replacement capabilities are optimized.

Both the seismic acceleration damper type and the seismic acceleration limiter type are constructed to damp the effect of the forces inputed to the snubber in order to eliminate potential failure or breakage of the equipment to which the snubber is mounted. As is common in prior art systems, both the seismic acceleration limiter type and the seismic acceleration damper type of the present invention employ an inertial mass rotationally mounted in the housing in order to achieve the desired damping effect.

The seismic acceleration damper type snubber is usually employed only for controlling harmonic motion, typically due to vibrations in the equipment. In the construction of this invention, a single worm is employed which drives a spur gear having drive teeth fully encircling the spur gear and engaged with the inertial mass. In this way, the harmonic forces acting upon the snubber are converted, when acting in either direction, from linear to rotary motion, through the rack member and a worm combination, with the rotary motion being transferred from the worm to rotationally drive the spur gear and the inertial mass.

The seismic acceleration limiter type snubber is similar in construction to the seismic acceleration damper type, but instead is constructed to alternatively drive the inertial mass, first in one direction and then in the opposite direction, in response to linear or seismic acceleration, which the snubber experiences at a particular time in a single direction.

The two additional types of snubbers which employ the basic construction of the present invention and are closely related are the seismic acceleration restraint type and the seismic velocity restraint type. The seismic acceleration restraint type snubber is constructed to freely axially translate under low force load conditions, while also being able to function as a rigid strut if the linear or harmonic motion experienced by the snubber reaches a predetermined threshold level.

The seismic velocity restraint type operates in a similar fashion to the seismic acceleration restraint type. However, instead of being converted into a completely rigid strut when the threshold level is exceeded, the seismic velocity restraint type snubber provides a slow, constant velocity, axial displacement capability.

As will be clearly apparent from the detailed description, the mechanical snubber of the present invention provides an inexpensive mechanical snubber capable of performing with equal or greater reliability than prior art mechanical snubbers, while also being convertible into a plurality of different snubber types with a minimum of mechanical variations. Furthermore, the prior art expensive system for converting axial translation into rotary motion has been completely eliminated, with a readily producible, comparatively inexpensive rack and worm combination providing the axial to rotary force conversion for the snubbers of the present invention.

The invention accordingly comprises the features of construction, combinations of elements, in arrangement of parts which will be exemplified in the construction hereinafter set forth and the scope of the invention will be indicated in the claims.

THE DRAWINGS

For a fuller understanding of the nature and objects of the invention, reference should be had to the following detailed description taken in connection with the accompanying drawings, in which:

FIG. 5 is a front elevation view, partially in cross-section and partially broken away, of another embodiment of the mechanical snubber of the present invention shown with the housing of the snubber removed;

FIG. 5A is a front elevation view, partially in cross-section and partially broken away, of another embodiment of the mechanical snubber of the present invention;

FIGS. 6 and 7 are both front elevation views, partially in cross-section and partially broken away, showing two additional embodiments of the mechanical snubber of the present invention;

FIG. 8 is a perspective view partially broken away, of one embodiment for the rack member of the mechanical snubber;

FIG. 9 is a top plan view of the rack member of FIG. 8;

FIG. 10 is a top plan view, partially broken away, of an alternative embodiment for the rack member for the mechanical snubber of the present invention;

FIG. 11 is a cross-sectional side elevation view, partially broken away, showing an alternative inertial mass driving system for the mechanical snubber of the present invention;

FIG. 12 is a cross-sectional side elevation view of the driving system of FIG. 11 taken along line 12—12 of FIG. 11;

FIG. 13 is a front elevation view, partially in cross-section and partially broken away, of another alternative driving system for the inertial mass of the mechanical snubber of the present invention.

For convenience of reference and understanding, the same reference numerals are employed to designate the same elements throughout the several views of the drawings.

DETAILED DESCRIPTION

Figure 1:
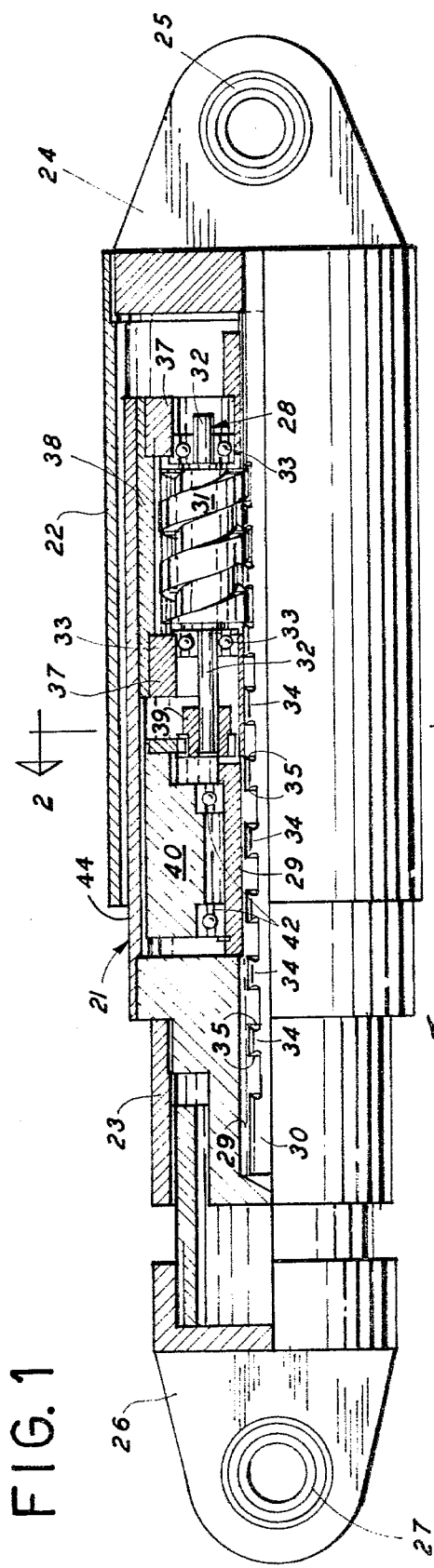
FIG. 1 is a front elevation view, partially broken away, of one embodiment of the mechanical snubber of the present invention.

In FIG. 1, one embodiment of mechanical snubber 20 is shown in its fully contracted positon. Mechanical snubber 20 incorporates a housing 21, with housing 21 being formed from two slidably engaged portions 22 and 23.

Housing portion 22 incorporates a mounting flange 24 and a mounting connector 25 formed therein while housing portion 23 incorporates mounting flange 26 with mounting connector 27 mounted therein. As is well known to one skilled in the art, snubbers are typically employed by mounting one end to a fixed support member while the other end is mounted to the equipment member for which the snubbing action is desired.

In order to achieve ease of interconnection and mounting of snubber 20 in any desired location, mounting connectors 25 and 27 are employed. Also, tube 44, of any desired length, is welded to housing portion 23, in order to span the desired distance in the mounting location. Of course, as would be obvious to one skilled in the art, any alternative mounting system can be employed without departing from the scope of this invention.

Housing 21 of snubber 20 is constructed with portions 22 and 23 slidably engaged with each other. In this way, when mounting plate 26 is affixed to a permanent location and mounting plate 24 is affixed to the equipment for which the snubbing action is desired, any forces experienced by the equipment will be transferred to mounting plate 24, causing housing portion 22 to axially move in sliding engagement with housing portion 23. In FIG. 1, the fully contracted position is shown, so that any movement of snubber 20, as shown in FIG. 1, is with housing portion 22 axially translating to the right.

In order to provide the desired snubbing action in an attempt to absorb or damp the forces which the equipment mounted to mounting plate 24 experiences, it is first necessary to convert the axial translating motion into rotary motion. As fully discussed above, snubber 20 of the present invention eliminates the expensive prior art ball screw systems by employing a rack member 30 controllably connected to a worm gear 31.

Rack member 30 is affixed at one of its ends to housing portion 22, and positioned in shaft 29 of housing portion 23. Preferably, shaft 29 is formed in bearing support plates 37, described below. In this way, rack member 30 is free to translate axially in response to the axial movement of housing portion 22 relative to housing portion 23.

Worm 31 is rotationally mounted in housing portion 23 by employing axial shaft 32 and bearing members 33. Furthermore, worm 31 incorporates an appropriate pitch angle in its worm construction in order to assure that its controlled engagement with rack member 30 will cause worm 31 to rotate in response to any axial movement of rack member 30. Consequently, as rack member 30 moves axially, either left or right, worm 31 rotates about axial shaft 32 with assurance of free axial rotation due to bearing assemblies 33.

In the preferred embodiment, worm 31 is rotationally mounted as a worm assembly 28. In addition to worm 31, axial shaft 32, and bearing member 33, worm assembly 28 also incorporates bearing support plates 37 and peripherally enclosing wall 38.

Bearing members 33 are then mounted in accommodating holes in bearing support plates 37 and worm 31 and axial shaft 32 in its rotationally supported position in bearing members 33.

Peripherally enclosing wall 38 provides an enveloping supporting shell for worm assembly 28 and has its outer surface mounted to the inner surface of housing portion 22. Both bearing support plates 37 preferably comprise circular discs and are securely mounted to wall 38, forming and defining a worm gear support zone therebetween.

In FIG. 1, one embodiment of rack member 30 is shown. By referring to FIGS. 8 and 9, the preferred construction of rack member 30 can best be understood.

Rack member 30 incorporates a plurality of drive teeth or grooves 34, extending along a substantial length of rack member 30. Each drive tooth 34 incorporates racked or pitched groove-defining sidewalls 35. Furthermore, raked sidewalls 35 are constructed so that each sidewall 35 comprises two substantially equal wall portions, with each of the wall portions lying in a plane which converges with the plane of the other wall portion.

As a result, each sidewall 35 incorporates an apex line 36 at the line of convergence of the two sidewall portions. Also, each sidewall portion is substantially perpendicular to the base-forming surface of its drive tooth 34.

Since the sidewall portions are all constructed perpendicular to the base of the teeth and are all constructed with a rake angle causing the sidewall portion to extend inwardly, apex line 36 of each drive tooth 34 forms the driving contact line for the drive tooth which is substantially perpendicular to the central axis of the rack member.

This unique line contact construction has been found to be extremely important. As shown schematically in FIG. 1, contact line 36 forms the sole portion of each drive tooth 34 which actually contacts worm 31 and provides the desired driving engagement therewith. With this construction, the undesirable prior art point contact is eliminated, and trouble free line contact is provided. Furthermore, the prior art major problem caused by Brinelling is completely eliminated, and long lasting, trouble-free operation is enhanced through the snubber of this invention.

A rack member 30 can be constructed with two sets of drive teeth 34, positioned 180 degrees radially opposed to each other. In this way, the same rack member can be employed in both the embodiments of FIGS. 1 and 3. However, if desired, a rack member with a single set of drive teeth may be employed in those embodiments in which only one worm is driven.

Furthermore, alternative rack member constructions can be employed without departing from the scope of this invention. One alternative construction is shown in FIG. 10 and is discussed in detail below. However, other constructions, such as employing a plurality of rotating sleeves as the drive teeth, can also be used successfully.

By using the axial to rotary motion conversion system, of this invention, various alternative snubber types as well as alternative embodiments for those snubber types are achieved both economically and easily without many mechanical parts or assembly problems.

The remainder of this specification thoroughly discloses and discusses all of the alternative types of mechanical snubbers of this present invention, as well as the alternative embodiments of these types of snubbers. However, the common feature in each of these alternative snubber constructions is the unique system for converting axial motion into rotary motion.

This conversion system which, as described above, employs an axially translating rack member drivingly engaged with a rotationally mounted worm gear is a unique force conversion system for a mechanical snubber and may be employed in numerous alternative construction other than the construction disclosed herein, without departing from the scope of this invention.

Seismic Acceleration Damper Type

Figure 2:
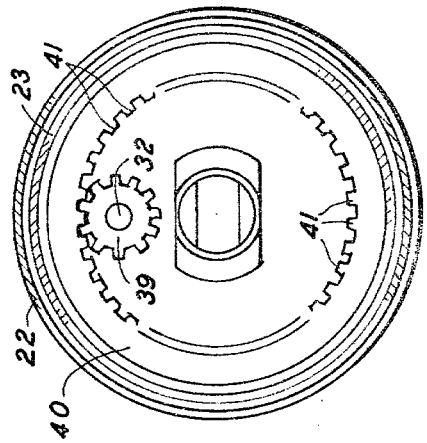
FIG. 2 is a cross-sectional side elevation view of the mechanical snubber of FIG. 1, taken along line 2—2 of FIG. 1.

The embodiment of snubber 20 shown in FIGS. 1 and 2 is a seismic acceleration damper type snubber. This snubber type is typically employed for smoothing out the effects caused upon equipment due to harmonic motion, typically caused from vibration sources. This vibration damping and smoothing effect is achieved by transferring the force loads on the equipment mounted to snubber 22 to an inertial mass mounted in snubber 20. In this way, the harmonic motion inducing forces, which the equipment would otherwise experience, are damped and instead these forces are absorbed through mechanical snubber 20, resulting in only the smooth limited movement of the mounted equipment.

In this embodiment, mechanical snubber 20 incorporates an inertial mass 40 rotationally mounted about shaft 29 in housing portion 23. In order to prevent wear and assure rotation when desired, inertial mass 40 is concentrically mounted about shaft 29 with bearings 42.

As best seen in FIG. 2, inertial mass 40 substantially fills the entire inside diameter of the peripheral wall of housing portion 23 and incorporates a concentric ring of gear teeth 41, inwardly spaced from the outer diameter of inertial mass 40. If desired, as shown in FIG. 1, a gear tooth ring can be journalled with inertial mass 40 in order to provide the drive teeth 41.

This embodiment of snubber 20 also incorporates a spur gear 39 journalled to one end of shaft 32, with the teeth of spur gear 39 drivingly engaged with teeth 41 of inertial mass 40. In this way, the rotation of worm 31 rotationally drives inertial mass 40 about shaft 29 of housing portion 23.

In operation, the harmonic motion inducing forces, to which the equipment is subjected, acts upon housing portion 22 in an attempt to slidably translate housing portion 22 with respect to housing portion 23.

However, the torsional inertia of inertial mass 40 resists the harmonic motion inducing forces and results in a damping of vibration and smoothing effect being imparted to the equipment. As is obvious to one skilled in the art, this initial force damping occurs since inertial mass 40 when at rest resists being rotated and consequently requires a specific rotational force threshold to initiate the rotation and reversal of mass 40 due to its inertial properties. In this way, the initial forces acting upon the equipment are damped.

If the vibration forces are great enough, these forces will cause housing portion 22 to slidably translate with respect to housing portion 23. This axial, sliding translation also causes rack member 30 to move axially in direct response to the level of the applied force. The axial translation of rack member 30 cause worm 31 to rotate about its central axis along with its supporting shaft 32, causing spur gear 39 to rotate and drive inertial mass 40.

Once inertial mass 40 has begun rotating in one direction, mass 40 will resist rotation in the opposite direction. However, since the vibration load on the equipment produces harmonic motion, requiring continuous reversal of direction, the forces inherent in the force load on the snubber are constantly being resisted by the rotational inertia of mass 40, providing a smooth, problem-free force level response to the equipment.

Seismic Acceleration Limiter Type

Figure 3:
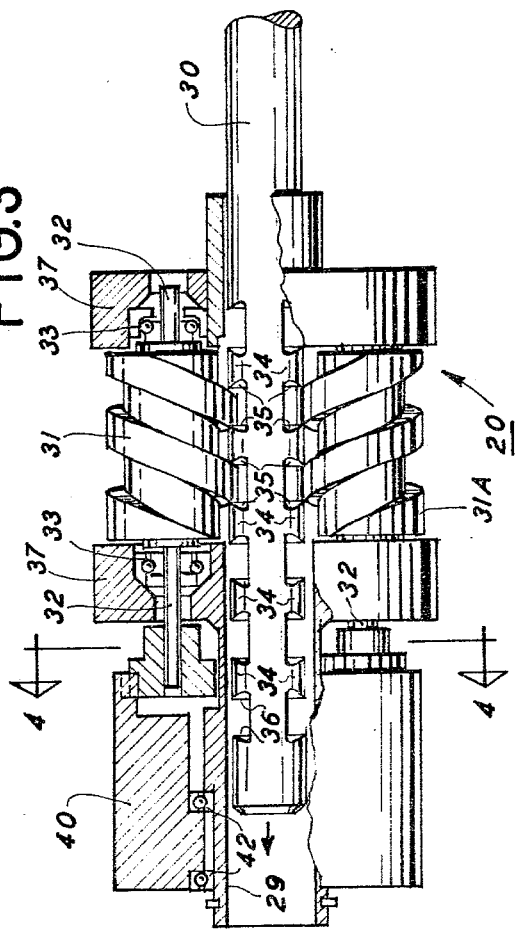
FIG. 3 is a front elevation view, partially in cross-section and partially broken away of another embodiment of the mechanical snubber of the present invention with the snubber housing removed.
Figure 4:
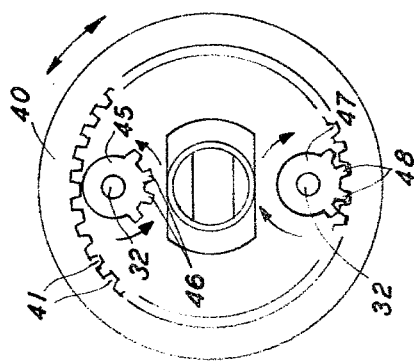
FIG. 4 is a cross-sectional side elevation view of the mechanical snubber of FIG. 3, taken along line 4—4 of FIG. 3.

In FIGS. 3 and 4, an alternative construction of the mechanical snubber of the present invention is shown. In this embodiment, mechanical snubber 20 is constructed as a seismic acceleration limiter type snubber which is employed to limit linear or seismic acceleration and provide an output acceleration of its own which is maintained at a preset level.

The actual construction of the seismic acceleration limiter type snubber is very similar to the construction discussed above, in reference to FIGS. 1 and 2, with the major variations being the use of two worms 31 and 31A and different types of spur gears being driven by the worm.

As shown in FIGS. 3 and 4, this embodiment of snubber 20 incorporates rack member 30 having driving teeth or grooves 34 formed therein, with the raked sidewalls 35, and contact lines 36 discussed above. However, rack member 30 of this embodiment, must incorporate the two complete sets of grooves 34 in order to drive the two worms 31 and 31A.

The two worms 31 and 31A are both drivingly engaged with one set of drive teeth 34 of rack member 30. In this way, the axial translation of rack member 30 produces simultaneous rotation of both worms 31 and 31A. Furthermore, worms 31 and 31A have drive teeth of opposite pitch angles, so that the single axial translation of rack member 30 causes simultaneous rotation of worms 31 and 31A in opposite directions.

Spur gear 45 is securely journalled to shaft 32 of worm 31 while spur gear 47 is securely journalled to shaft 32 of worm 31A. As shown in FIG. 4, spur gear 45 incorporates only a partial set of drive teeth 46 while spur gear 47 similarly incorporates a partial set of drive teeth 48.

The actual circumferential area about which drive teeth 46 and 48 extend about spur gears 45 and 47, respectively, depends upon design criteria. However, it is required that the drive teeth of one of the spur gears must be disengaged before the drive teeth of the other spur gear start engagement with teeth 41 of inertial mass 40. Consequently, drive teeth 46 and 48 must occupy less than 180 degrees of the circumference of spur gears 45 and 47.

By referring to FIGS. 3 and 4, the operation of this embodiment of mechanical snubber 20 can best be understood. As shown therein, rack member 30 is free to axially translate in either direction causing the simultaneous rotation of both worms 31 and 31A. As rack member 30 translates to the left, as shown by the arrow in FIG. 3, worm 31 rotates counterclockwise as shown in FIG. 4, while worm 31A rotates clockwise. As discussed above, this directionally opposite rotation is created by employing worms 31 and 31A with drive teeth having oppositely pitched helix angles from each other.

Since spur gear 45 is journalled to shaft 32 of worm 31, the rotation of worm 31 drives spur gear 45. Similarly, the rotation of worm 31A causes spur gear 47 to rotate. Furthermore, spur gears 45 and 47 only have drive teeth partially extending about their circumference with the drive teeth arranged to be out of phase with each other. Consequently, the rotation of spur gear 47, when drivingly engaged with inertial mass 40 as shown in FIG. 4, causes inertial mass 40 to rotate in the same direction as spur gear 47.

However, when drive teeth 48 of spur gear 47 are no longer engaged with teeth 41 of inertial mass 40, drive teeth 46 of spur gear 45 become drivingly engaged with teeth 41 of inertial mass 40, causing inertial mass 40 to move in the opposite rotational direction. The energy generated in reversing direction thus resists the axial translation of the rack.

In this way, the linear or seismic acceleration, which is transferred to mechanical snubber 20 and causes rack member 30 to axially translate, is converted into a controlled, limited, axial acceleration, providing the desired oscillatory damping required for the equipment safety.

Alternative Inertial Mass Driving Systems

In FIGS. 11, 12 and 13, two alternative systems for rotationally driving inertial mass 40 are disclosed. The first embodiment, which is schematically shown in FIGS. 11 and 12, employs an eccentrically mounted pin construction to replace the dual spur gears construction disclosed and discussed above in reference to FIGS. 3 and 4.

This alternative embodiment employs a single worm 31, rotationally mounted in bearing support plate 37, and positioned for driving engagement with inertial mass 40, which is rotationally mounted about central shaft 29. Rotationally journaled to axial shaft 32 of worm 31 is boss member 73, which incorporates an eccentrically mounted pin 74.

Inertial mass 40 incorporates a radially extending slot 75 extending between the inside diameter and the outside diameter of inertial mass 40. As shown in FIGS. 11 and 12, eccentrically mounted pin 74 of boss 73 is positioned in slot 75 of inertial mass 40 for driving engagement of inertial mass 40 thereby.

The operation of this embodiment of mechanical snubber 20 is identical to the operation discussed above in reference to FIGS. 3 and 4, which represent the seismic acceleration limiter type snubber. However, by employing the inertial mass driving system of this embodiment, the necessity for using a dual worm structure is eliminated, along with the necessity for two partially-toothed spur gears. With this driving system, the rotation of worm 31 in a single rotational direction, in response to the axial translation of the rack member, causes boss 73 and eccentric pins 74 to similarly rotate about axial support rod 32 and drive inertial mass 40 in first one and then in the opposite direction.

By referring to FIG. 12, the achievement of oscillatory damping with a single eccentrically mounted pin 74 will best be understood. As boss member 73 and eccentric pin 74 rotate clockwise, as shown by the arrow in FIG. 12, inertial mass 40 is rotationally driven clockwise, as pin 74 slidingly moves through slot 75 of inertial mass 40.

However, when pin 74 has moved from its uppermost position near the outer peripheral surface of inertial mass 40, as shown in FIG. 12, to its lowermost position adjacent the internal diameter of inertial mass 40, the continued clockwise rotation of boss 73 and pin 74 now forces inertial mass 40 to move in a counterclockwise direction. This counterclockwise rotation of inertial mass 40 continues until pin 74 has returned to its original position shown in FIG. 12.

In this way, the rotation of worm 31 in a single direction causes inertial mass 40 to continuously rotate about its central axis in a clockwise and then a counterclockwise direction. Consequently, the identical inertial mass rotation characteristics are achieved with this alternative driving system as was discussed above in reference to FIGS. 3 and 4.

In this way, an additional, simplified construction for a seismic acceleration limiter type snubber is provided.

Although either inertial mass driving system can be employed with equal success, the eccentric pin driving system is preferred for its simplicity of construction and minimization of parts required to achieve the same result. In this way, the system can be manufactured less expensively, providing an even greater cost savings to the user without in any way affecting the operational characteristics of the snubber.

In FIG. 13, an alternative inertial mass driving system is disclosed which employs eccentrically mounted pin 74 mounted to boss member 73. However, in this construction, the worm does not directly drive the boss 73 and eccentric pin 74. Instead, the rotational movement of worm 31 and axial shaft 32 are directly inputed into a gear train system 77 which is designed to accentuate the snubbing action.

In the particular embodiment, a step-up ratio gear train system 77 is employed so that one rotation of worm 31 and shaft 32 achieves a desired multiple rotation of boss 73 and eccentric pin 74. In this way, inertial mass 40 is rotationally driven more frequently than is otherwise achievable with the direct drive system, thereby allowing this embodiment of mechanical snubber 20 to provide an even greater damping effect. This ratio can easily be changed to suit particular applications.

Seismic Acceleration Restraint Type

In FIGS. 5 and 6, alternative embodiments for a seismic acceleration restraint type mechanical snubber are shown. A seismic acceleration restraint type snubber is typically employed in situations where limited freedom in response to linear or harmonic motion below a predetermined level of acceleration is desired, while also functioning as a rigid strut when the threshold level of acceleration has been exceeded. This situation is typically encountered when equipment parts should be allowed to freely expand and contract during their normal operation, while also preventing any extraordinary vibration or seismic induced forces from causing injury to the equipment.

In the embodiment shown in FIG. 5, this embodiment of mechanical snubber 20 incorporates axial translating rack member 30 controllably engaged with worm 31. Worm 31 is rotationally mounted in support plate 37 with axial shaft 32 rotationally engaged with bearings 33.

In addition to this basic structure, which is substantially identical to the construction discussed above, this embodiment of mechanical snubber 20 incorporates two spring members 50 mounted in biasing engagement at both ends of axial shaft 32 of worm 31. Furthermore, two adjustment screws 51 are threadedly engaged with each bearing support plate 37 and positioned for engagement with spring members 50.

In this way, spring 50 is maintained under compression positioned between adjacent screw 51 and a terminating end of shaft 32. Furthermore, the compressive force of spring 50 is adjustably controlled by rotational movement of screw 51.

In addition to being rotationally mounted between bearing support plates 37, worm 31 and axial shaft 32 are capable of lateral, side-to-side movement between surfaces 52 of bearing support plates 37. When either of the side surfaces 53 of worm 31 contacts either side surface 52 of either bearing support plate 37, the frictional engagement between surfaces 52 and 53 prevent rotation of worm 31. This frictional engagement also prevents axial translation of rack member 30.

In operation, rack member 30 is free to axially translate in either direction under force loads below a predetermined level. This predetermined level is controlled through the combination of adjustment screws 51 and springs 50. The compressive force of springs 50 impart a predetermined force level to shaft 32 of worm 31 which resists the axial movement of worm 31 and shaft 32, and maintains worm 31 in its central rotational position between plates 37.

As is obvious to one skilled in the art, the axial translation of rack member 30 imparts an axial moving force to worm 31. As long as the compression force of spring 50 exceeds the axial force imparted to worm 31, worm 31 freely rotates between bearing support plate 37 allowing rack member 30 to freely translate.

However, when an acceleration load greater than the compression force of spring 50 is introduced to rack member 30, worm 31 axially moves in the same direction as rack member 30 until side surface 53 of worm 31 is frictionally engaged with side surface 52 of bearing support plate 37. With worm 31 frictionally engaged with bearing plate 37, continued rotational movement of worm 31 is prevented, axial translation of rack member 30 is stopped and the entire assembly is incapable of moving, thereby becoming a rigid strut. This construction of snubber 20 will continue to function as a rigid strut under these load conditions until the force on rack member 30 is either eliminated or reduced to a level where the compressive force of spring 50 overcomes the axial force on worm 31, causing worm 31 to be pushed out of frictional engagement with bearing support plate 37 and return to a position which allows rotation of worm 31 and axial translation of rack member 30.

In FIG. 6, an alternative construction for the seismic acceleration restraint type mechanical snubber 20 of the present invention is shown. In this embodiment of mechanical snubber 20, rack member 60 and worm 61 both comprise alternative physical constructions.

By referring to FIGS. 6 and 10, this alternative construction of rack member 60 can best be understood. Instead of having grooves extending substantially perpendicular to the central axis of the rack, as is true with rack member 30, grooves 64 of rack member 60 are cut angularly or transversely to the central axis of rack member 60. Furthermore, grooves 64 incorporate sloping side walls 65 which slope away from the base of groove 64 as the sidewall moves from bottom to the top outer peripheral surface of rack member 60.

Worm 61 of this embodiment incorporates tapered, sloping worm teeth as opposed to the non-tapered worm construction of 31. By employing both rack member 60 and worm 61 wherein both have tapered engaged teeth, the axial translation of rack member 60 causes worm 61 to rotate about its axial shaft 32, as well as causing worm 61 to move radially outwardly toward the enveloping housing wall 38. This radial outward movement is caused by the interconnected ramped surfaces 65 of gear teeth 64 of rack member 60 in combination with the tapered, sloping teeth of worm 61.

In addition to the alternative construction for rack member 60 and worm 61, this embodiment of mechanical snubber 20 also has bearings 33 mounted in an elliptically-shaped slot 57 formed in bearing support plates 37.

The central axis defining this elongated, enlarged portion of elliptical slot 57 lies in a plane radially extending from the central axis of rack member 60. In this way, worm 61, support shaft 32 and bearings 33 are free to radially move outwardly from the central axis of rack member 60 within the confines of elliptical slot 57.

Also, this embodiment of mechanical snubber 20 incorporates springs 56 mounted in compression between the outer peripheral surface of bearing 33 and wall 38. Spring 56 provides a biasing force for maintaining worm 61 fully engaged with rack member 60. If desired, the spring force can be adjustable by addition of screw means.

Although FIG. 6 only shows one of the two bearing support plates 37 in cross-section, both bearing support plates 37 comprise identical structures. In operation of this embodiment of mechanical snubber 20, rack member 60 is free to axially translate in either direction, in responses to the forces placed upon it, until these forces exceed a predetermined level. The axial translation of rack member 60 is provided through biasing springs 56 which maintain worm 61 in inter-engagement with teeth 64 of rack member 60. As long as springs 56 are capable of overcoming the component of force which tends to propel worm 61 in a radial outward direction, worm 61 freely rotates about shaft 32 within bearings 33, and rack member 60 is free to axially translate, rotationally driving worm 61.

However, when the force placed upon rack member 60 exceeds the biasing forces of springs 56, the radially outward force, placed upon worm 61 by the axial translation of rack member 60, causes worm 61 to move radially outwardly, within the confines of slot 57 of bearing support plates 37, until the outer diameter of worm 61 frictionally engages wall 38. When this frictional engagement occurs, worm 61 is prevented from rotation. Furthermore, since the radial movement of worm 61 is not enough to remove the outer diameter of worm 61 from interconnection with rack member 60, rack member 60 is also prevented from further axial translation. As a result, the snubber is converted into a rigid strut.

This embodiment of mechanical snubber 20 continues to function as a rigid strut as long as the threshold-exceeding force level is maintained on rack member 60 which will maintain worm 61 in frictional engagement with wall 38. As soon as this force level is removed or is reduced below the threshold level, spring members 56 push worm 61 out of frictional engagement with wall 38 and rack member 60 is able to axially translate, while worm 61 freely rotates.

With both the embodiments of FIGS. 5 and 6, the mechanical snubber 20 of the present invention achieves (1) free axial translation of rack member 60 for all force and acceleration levels up to a particular, selectable threshold level, in order to accommodate normal expansion and contraction or small movements of the equipment, and (2) functioning as a rigid strut, in order to prevent any extraordinary high forces from destroying or injuring the equipment. Furthermore, as is clearly shown in these alternative embodiments of mechanical snubber 20 of the present invention, the snubber automatically resets itself to the normal operative condition as soon as the high force loads have been removed. As is found in many prior art systems, resetting must be done by hand once the threshold level has been exceeded. With the snubber of the present invention, this necessity is completely eliminated and a problem-free snubber is achieved which does not require servicing, checking, or resetting at any time.

SEISMIC VELOCITY RESTRAINT TYPE

By referring to FIGS. 5A and 7, alternative construction of mechanical snubber 20 of the present invention is shown wherein the snubber provides the requirement for a seismic velocity restraint type snubber. Typically, a seismic velocity restraint type snubber operates under linear or harmonic motion, in a manner similar to the seismic acceleration restraint type, but instead of locking and becoming a rigid strut, the seismic velocity restraint type snubber provides slow, continuous displacement at a constant velocity as long as forces acting on the snubber exceeds the threshold level.

One embodiment of the seismic velocity restraint type snubber is best understood by referring to FIGS. 5 and 5A. In this embodiment, mechanical snubber 20 functions in the identical manner discussed above in relation to the embodiment shown in FIG. 5. The only exception is, as shown in FIG. 5A, that a low coefficient of friction washer 67 is mounted on both sides of worm 31 between wall 52 of bearing support plate 37 and wall 53 of worm 31.

In this way, when worm 31 moves axially in response the threshold-exceeding force levels being introduced to rack member 30, low coefficient of friction washer 67 which has a low coefficient of friction, becomes sandwiched between walls 52 and 53. With this construction, worm 31 is not prevented from rotating, but instead is capable of rotating slowly due to the interposition of low coefficient of friction washer 67 with its low coefficient of friction between walls 52 and 53. As long as the threshold-exceeding force level is maintained on rack member 30, worm 31 continues to slowly rotate at a constant rate while rack member 30, similarly, slowly translates at a constant velocity.

The alternative embodiment of the seismic velocity restraint type snubber, shown in FIG. 7, operates in a manner similar to the embodiment of the seismic acceleration restraint type snubber discussed above in reference to FIG. 6. Similarly, all of the additional components incorporated in the embodiment discussed in relation to FIG. 6 are employed in the embodiment shown in FIG. 7. In addition to these components, this embodiment of mechanical snubber 20 also incorporates an independent bearing assembly 68 and a substantially cylindrical sleeve or mass 69 which is rotationally engaged with bearing assembly 68.

In operation, this embodiment of mechanical snubber 20 operates identically to the embodiment shown in FIG. 6 until the pre-set threshold force is exceeded. In this embodiment, however, worm 61 moves radially outwardly into frictional engagement with cylindrical sleeve 69.

Since cylindrical sleeve 69 is capable of rotating slowly about bearing assembly 68, the frictional engagement of worm 61 with sleeve 69 allows worm 61 to continue to rotate, but at a slower rate, while rotationally driving sleeve or tube 69 about bearing assembly 68. Consequently, as long as the threshold exceeding forces are maintained on rack member 60, worm 61 is capable of slowly rotating, allowing rack member 60 to slowly axially translate at a constant velocity. As soon as the threshold force is removed, worm 61 moves out of frictional driving engagement with sleeve 69, and returns to its normal position until the threshold force is again exceeded.

In either the embodiment of FIG. 5A or the embodiment of FIG. 7, mechanical snubber 20 is capable of achieving the requirements for a seismic velocity restraint type snubber, with (1) free axial movement of the snubber being provided when the forces are below the predetermined threshold and (2) slow, controlled, constant velocity movement being achieved by the snubber at threshold-exceeding force and acceleration levels.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following Claims are intended to cover all the generic and specific features of the invention herein described, and all statements of the scope of the invention which, as a matter of language, might be said to fall therebetween.

Having described my invention, what I claim as new and desire to secure by Letters Patent is:

1. A mechanical snubber comprising:
(A) a housing incorporating
   (a) a first portion,
   (b) a second portion slidably engaged with the first portion, and
   (c) mounting means secured at the ends of both the first and second portions for mounting one of said portions to a first support and for mounting the other of said portions to a second support;
(B) a longitudinally extending rack member having a longitudinally extending axis therethrough
   (a) incorporating a plurality of transversely extending drive teeth axially arrayed along the rack member,
   (b) fixedly mounted at one end thereof to the first portion of the housing, and
   (c) positioned for axial translation in response to relative movement between the first portion and the second portion of the housing;
(C) a worm
   (a) rotationally mounted in the second portion of the housing and having an axis substantially parallel to and spaced from the longitudinally-extending rack member's axis, and
   (b) controllably engaged with the rack member for induced rotational movement thereof in response to the axial translation of the rack member,
whereby relative axially sliding movement of the housing portions is converted into rotary motion for enabling the snubber to limit the movement of said first and second portions relative to each other.

2. The mechanical snubber defined in claim 1, wherein the rack member further comprises:

(d) at least one set of drive teeth axially arrayed along a major portion of the rack member,
   (e) each of said drive teeth being formed in the outer peripheral surface of the rack member and extending substantially perpendicular to the longitudinal axis of the rack member, and
   (f) each pair of said drive teeth having facing sidewalls, with each sidewall comprising
      (1) a forwardly protruding worm driving contact edge, substantially perpendicularly disposed to the longitudinal axis of the rack member, and
      (2) two substantially equal-sized, intersecting surfaces defining the contact edge and extending angularly rearwardly from contact edge,
   whereby said rack member incorporates a plurality of contact edges forming the driving element between the rack member and the worm, thereby substantially eliminating point contact wear and assuring continuous long-term operation.

3. The mechanical snubber defined in claim 1, wherein the worm incorporates an axial support shaft rotatably journalled to the second housing portion, and the snubber further comprises:
(D) an inertial mass
   (a) rotationally mounted in the second portion of the housing, whose rotation is substantially concentric to the central axis of the rack member, and
   (b) drivingly engaged with the worm.

4. The mechanical snubber defined in claim 3, wherein the inertial mass comprise drive means positioned at one end thereof, and the snubber further comprises:
(E) a spur gear
   (a) journalled to one end of the axial support shaft of the worm, and
   (b) drivingly engaged with the drive means of the inertial mass,
whereby rotation of the worm causes rotation of the inertial mass.

5. The mechanical snubber defined in claim 3, wherein the snubber further comprises:
(E) a drive pin
   (a) eccentrically mounted to the axial support shaft of the worm for induced rotation thereof in response to rotation of the worm, and
   (b) drivingly engaged with the inertial mass for inducing oscillatory rotation of the inertial mass.

6. The mechanical snubber defined in claim 5, wherein the inertial mass comprises slot means formed in one terminating end thereof for cooperative engagement of said eccentrically mounted drive pin therein for providing the desired driving engagement.

7. The mechanical snubber defined in claim 3, wherein the snubber further comprises:
(E) a gear train assembly
   (a) connected to the axial support shaft of the worm, and
   (b) incorporating drive means controllably engaged with the inertial mass to provide the desired driving rotation of the inertial mass.

8. The mechanical snubber defined in claim 7, wherein said drive means is further defined as comprising a pin member eccentrically mounted to a gear member of the gear train and the gear train is further defined as comprising a step-up gear ratio, whereby the number of rotations of the eccentrically mounted inertial mass drive pin is increased for each revolution of the worm.

9. The mechanical snubber defined in claim 1, wherein the rack member further comprises:
(d) at least one set of drive teeth axially arrayed along a major portion of the rack member, and
(e) each of said drive teeth
(1) being formed in the outer peripheral surface of the rack member,
(2) positioned in parallel relationship to each other,
(3) extending in a direction skewed to the longitudinal axis of the rack member, and
(4) each pair of said teeth having facing ramped sloping sidewalls diverging from bottom to top, and the worm gear is further defined as comprising
(C) ramped, sloping sidewalls formed along the worm drive thread, with said sidewalls converging from bottom to top.

10. A mechanical snubber comprising:
(A) a housing incorporating
 (a) a first portion,
 (b) a second portion slidably engaged with the first portion, and
 (c) mounting means secured at the ends of both the first and second portions for mounting one of said portions to a first support and for mounting the other of said portions to a second support;
(B) a longitudinally-extending rack member having a longitudinally extending axis therethrough
 (a) incorporating a plurality of transversely extending drive teeth axially arrayed along the rack member,
 (b) fixedly mounted at one end thereof to the first portion of the housing, and
 (c) positioned for axial translation in a response to relative movement between the first portion and the second portion of the housing;
(C) a worm assembly securely mounted in the second portion of the housing incorporating
 (a) a pair of bearing plates transversely mounted in the second portion of the housing;
 (b) bearing means mounted in the bearing plates, and
 (c) a worm having an axis substantially parallel to and spaced from the longitudinally-extending rack member's axis rotationally journalled in the bearing means of the bearing plate and controllably engaged with the rack member for induced rotational movement thereof in response to the axial translation of the rack member;
(D) an inertial mass rotationally mounted in the second portion of the housing, whose rotation is substantially concentric to the central axis of the rack member; and
(E) connecting means for driving the inertial mass in response to the rotation of the worm,
whereby the axial translation of the rack member causes rotation of the inertial mass to damp the effects of vibration or other forces by limiting the movement of said first and second portions relative to each other.

11. A mechanical snubber comprising:
(A) a housing incorporating
 (a) a first portion,
 (b) a second portion slidably engaged with the first portion, and
 (c) mounting means secured at the ends of both the first and second portions for mounting one of said portions to a first support and for mounting the other of said portions to a second support;
(B) force conversion means for converting relative axial motion between the first and second housing portions into rotary motion for enabling the snubber to limit the movement of the first and second portions relative to each other, said force conversion means incorporating
 (a) an axial translating member having a longitudinal axis, and
 (b) a rotating member having an axis substantially parallel to and spaced from the axial translating member's axis, the rotating member engaging with the axial translating member and rotating in response to translation of the axial translation member;
(C) an inertial mass
 (a) rotationally mounted in the second portion of the housing, the axis of rotation of the inertial mass being substantially concentric to the central axis of the axial translating member, and
 (b) drivingly engaged with the rotating member;
(D) a drive pin
 (a) eccentrically mounted to the rotating member for induced revolution of the drive pin around the axis of rotation of the
 (b) drivingly engaged with the inertial mass for inducing oscillatory rotation of the inertial mass in response to unidirectional rotation of said rotating member,
whereby the oscillatory rotation of the inertial mass damps the effects of vibration or other forces by limiting the movement of said first and second portions relative to each other.

* * * * *